United States Patent [19]

Harna

[11] 3,780,213

[45] Dec. 18, 1973

[54] AIR CODE BURST GENERATOR

[75] Inventor: Hyacint E. Harna, Cicero, Ill.

[73] Assignee: Zenith Radio Corporation, Chicago, Ill.

[22] Filed: Dec. 20, 1971

[21] Appl. No.: 209,975

[52] U.S. Cl. .......................... 178/5.1, 328/48, 328/63, 331/78

[51] Int. Cl. .......................... H04n 1/44, H03k 1/00

[58] Field of Search .......................... 178/5.1; 328/25, 328/30, 39, 48, 60, 61, 63, 169, 173, 225, 54, 78; 307/271; 331/78

[56] References Cited

UNITED STATES PATENTS

| | | | |
|---|---|---|---|
| 3,716,797 | 2/1973 | Hendrickson et al. | 328/63 |
| 3,681,620 | 8/1972 | Hoge | 307/271 |
| 3,657,658 | 4/1972 | Kubo | 328/48 X |
| 2,885,553 | 5/1959 | Albro et al. | 328/25 X |
| 3,073,892 | 1/1963 | Druz | 178/5.1 |

*Primary Examiner*—Maynard R. Wilbur
*Assistant Examiner*—S. C. Buczinski
*Attorney*—John J. Pederson and John H. Coult

[57] ABSTRACT

An air code burst generator for a subscription television system generates a discrete-frequency burst signal for each of a plurality of different applied code pulses. A higher harmonically-related continuous-wave signal is generated by a crystal controlled oscillator and divided down to the burst frequency by a counter, which is reset to an initial counting state upon the receipt of each code pulse to insure proper phasing of the transmitted burst signals. A novel output circuit maintains a predetermined average output level in the absence of burst signals.

12 Claims, 3 Drawing Figures

PATENTED DEC 18 1973 3,780,213

SHEET 1 OF 3

AIR CODE BURST GENERATOR

BACKGROUND OF THE INVENTION

This application is directed to subscription television encoding systems, and more particularly to an improved air code burst generator for use therein.

In a preferred subscription television system such as that described in detail in Pat. No. 3,244,806, issued Apr. 5, 1966 to George V. Morris and assigned to the present assignee, a transmitted video signal is protected against unauthorized reception by switching it between one operating mode, wherein the video signal is delayed, and another operating mode wherein it is translated without delay. The mode changes are made several times during each field in response to the amplitude variations of a rectangular-shaped switching signal developed in an encoder at the studio, giving the effect of a plurality of alternately displaced horizontal bands across the coded picture. As a further protection against unauthorized reception, the phase of the rectangular switching signal is varied randomly at random intervals, in response to a series of random-state control pulses from an inhibitable random pulse generator, giving a jittered effect to the picture as the alternately displaced bands vertically shift position in a random manner.

In order to decode this signal for application to a subscriber's television receiver, it is necessary to reconstruct within a decoder in the subscriber's home a rectangular switching signal in exact phase synchronism with its randomly varying parent at the studio. To this end, a series of synchronizing air code bursts are periodically transmitted in time coincidence with the random control pulses and at discrete frequencies representative of the state thereof. For optimum performance of the decoder it is desirable that the frequency and phase of these air code bursts be accurately controlled, and it is to circuitry for generating these bursts with necessary precision that the present invention is directed.

SUMMARY OF THE INVENTION

Accordingly, it is an object of the present invention to provide a new and improved air code burst generator for use in a subscription television system or the like.

It is a more specific object of the invention to provide a new and improved air code burst generator having improved frequency and phase stability.

It is a still more specific object of the invention to provide an air code burst generator which provides phase-compatibility between consecutive bursts.

It is still another specific object of the present invention to provide an air code burst generator which provides a uniform output level notwithstanding the absence of an output burst signal.

In accordance with the invention, an air code burst generator for producing a discrete-frequency burst output signal in response to an applied code pulse, comprises a continuous-wave signal source having an output frequency harmonically related to the discrete burst frequency. Frequency dividing means comprising a counter stepped by an applied signal from an initial state through a predetermined number of intermediate states to a final state are provided for dividing the frequency of the harmonically related signal down to the frequency of the discrete burst. Means are provided for resetting the counter to the initial state upon receipt of the code pulse; and switching means are also provided for applying the continuous-wave signal from the source to the counter to generate with phase predictability the burst output signal.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings and in which:

DESCRIPTION OF THE PREFERRED EMBODIMENT

Before considering the air code burst generator of the invention, it is desirable to have a general working knowledge of the video encoder portion of the system in which it is employed. To this end, a preferred encoder is depicted in block diagram form in FIG. 1.

Figure 1:
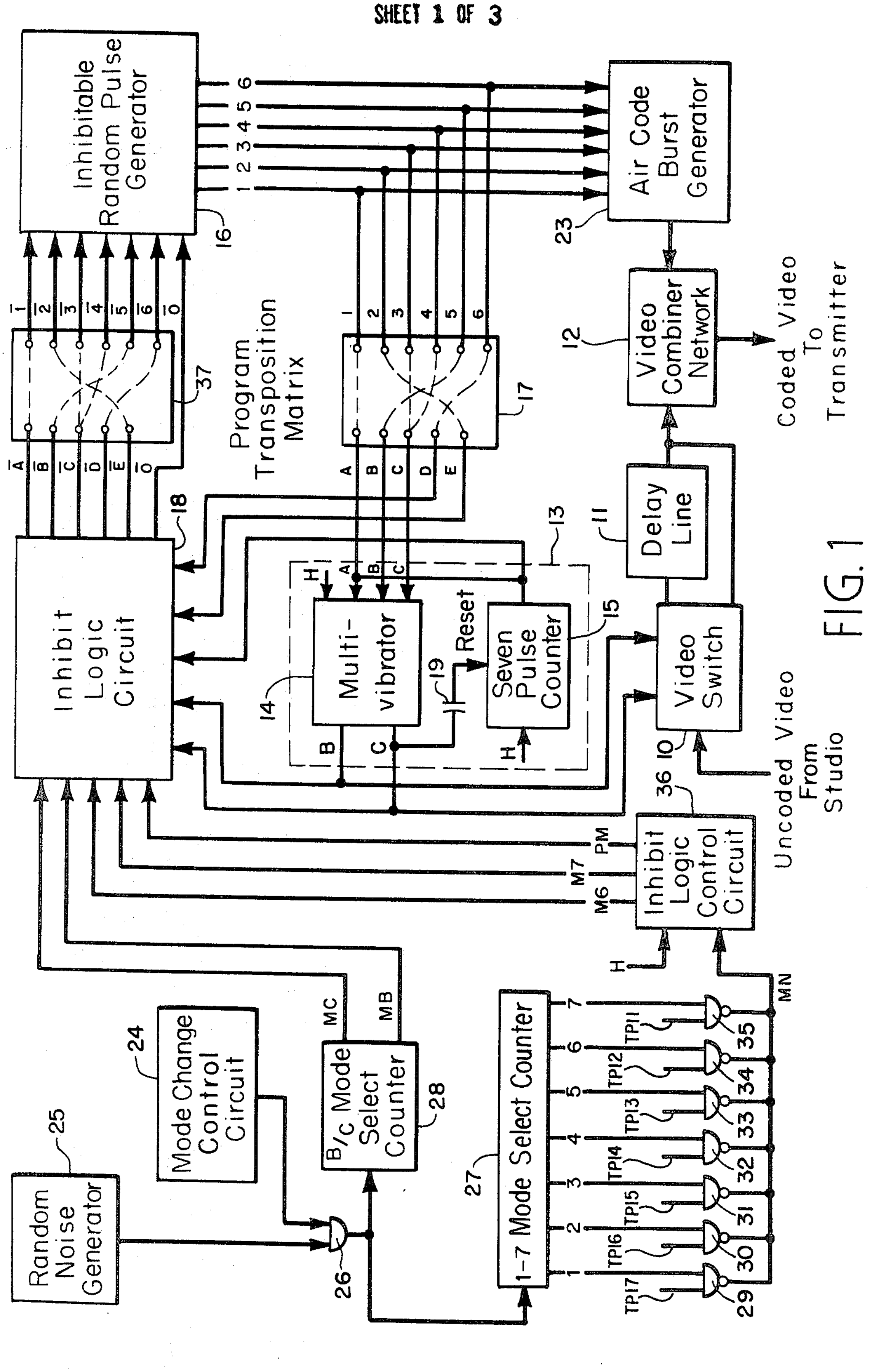
FIG. 1 is a block diagram of an encoder for a subscription television system embodying the present invention.

It will be recalled that prior to transmission in a preferred subscription television system the video signal is encoded by switching it alternately between delayed and undelayed modes several times during each field in response to a locally generated phase-varying rectangular switching signal. In the encoder of FIG. 1, encoding is accomplished by applying the uncoded video from the studio cameras and film chains to a video switch 10, which may comprise a pair of diodes alternately biased conductive and non-conductive or equivalent switching circuitry for directing the video signal to one of two outputs. One output of switch 10 is coupled to a delay line 11, which in accordance with current practice delays the video by approximately 1.675 $\mu$sec, or the duration of six cycles at the color subcarrier frequency. The other output is coupled through an appropriate matching network to a combining network 12, wherein the undelayed video is combined with the delayed video prior to further amplification and processing in the transmitter.

Video switch 10, after introducing a delay of one line to accommodate a like delay in decoding the synchronizing bursts in the decoders, switches between its two output states in response to a rectangular switching signal, which is generated by a mode square wave generator 13. Contained within generator 13 is a multivibrator 14 having two alternate quiescent states, hereinafter referred to as B and C. The push-pull output of multivibrator 14 is coupled via a pair of conductors to video switch 10 wherein it controls the functioning of that device.

Multivibrator 14 is not free-running, but instead switches between its two states in response to external control pulses applied to its three inputs, hereinafter designated A, B and C. The A input constitutes a toggle input, and pulses applied to this input cause the multivibrator to change state regardless of its present state.

The B and C inputs force the multivibrator to transition to like-designated states only if it is in the opposite state, otherwise no change occurs. To generate the rectangular switching signal, the output of a seven pulse counter 15 is coupled to input A. This counter counts horizontal pulses, and following the occurrence of every seventh horizontal pulse generates a control pulse which toggles the multivibrator. This in effect makes generator 13 free-running, changing the mode of video switch 10 every seven lines to form alternately delayed and undelayed seven-line-wide horizontal bands across the picture.

To introduce an element of randomness into the system, the phase of the rectangular switching signal is randomly shifted. This is accomplished by means of an inhibitable random pulse generator 16, which periodically generates in 10 predetermined time slots in each vertical retrace interval a series of 10 control effects each representative of a random one of seven possible counting states; six of these manifested in the form of a pulse on a respective one of six output terminals, and the seventh in the form of no output pulse at all. The six pulses are assigned certain functions, among them being the control of mode square wave generator 13. This assignment is accomplished by means of a program transposition matrix 17, which has the capability of coupling any of the six pulse outputs of generator 16 to any of five function circuits, to introduce an additional permutation level into the system for program identification and billing purposes. The five function circuits are arbitrarily designated A, B, C, D and E. A, B and C connect to their like-lettered inputs on multivibrator 14, and D and E connect to end-of-program and correlation control circuitry, respectively, in an inhibit logic circuit 18 which will be discussed later. In the encoder of FIG. 1, matrix 17 has been wired so that a 1 pulse from random pulse generator 16 toggles multivibrator 14 at its A input, a 3 pulse forces multivibrator 14 its C state, and a 5 pulse forces multivibrator 14 to its B state. Thus the possibility exists that the mode of generator 13 will be changed whenever one of these pulses is generated, depending on the state of multivibrator 14 at the time of generation.

In practice, multivibrator 14 is actually a two-stage circuit, comprising an input stage and an output or buffer stage. Pulses from generator 16 are applied to the input stage only during the 10 time slots of the air code burst interval, i.e., the portion of the vertical retrace interval reserved for effecting phase changes in the rectangular switching signal. During each of these 10 time slots the input stage of multivibrator 14, which may comprise a conventional J-K flip-flop, changes state in response to the occurrence of A, B, or C pulses from generator 16, finally assuming as a result of these pulses a B or C state at the end of each slot. The changes of state of the input stage are prevented from appearing at the output of multivibrator 14 by the buffer stage, which is gated to assume the state of the input flip-flop only during horizontal retrace intervals. This stage may take the form of a conventional J-K flip-flop having its J and K input terminals coupled to the Q and $\overline{Q}$ output terminals of the input flip-flop and its clock terminal coupled to a source of horizontal retrace pulses. With this arrangement the output of multivibrator 14 is changed only during horizontal retrace intervals to the state finally assumed by the input flip-flop at the end of the preceding time slot.

Once the output state of multivibrator 14 has been thus determined, it remains in that state throughout the succeeding time slot, notwithstanding that its input stage may be responding to pulses from generator 16 towards determining the state for the next time slot. This process takes place 10 times during each vertical retrace interval; corresponding to respective ones of the 10 time slots of the air code burst interval.

Once the air code burst interval has ended, seven pulse counter 15 continues to toggle multivibrator 14 every seventh horizontal line to sustain the rectangular switching signal for the duration of the succeeding field. To insure that following the air code burst interval multivibrator 14 will run at whatever phase is established by the preceding 10 control effects from inhibitable random pulse generator 16, and not be returned to its previous phase by the first output from seven pulse counter 15, a reset of counter 15 is automatically accomplished following each C to B transition forced by the pusles from generator 16 during the air code burst interval. This is accomplished circuit-wise by a capacitor 19 connected between the C output of multivibrator 14 and the reset input of seven pulse counter 15, which together with the internal impedance of the counter form a differentiating network for converting C to B transitions to suitable reset pulses.

Figure 2:
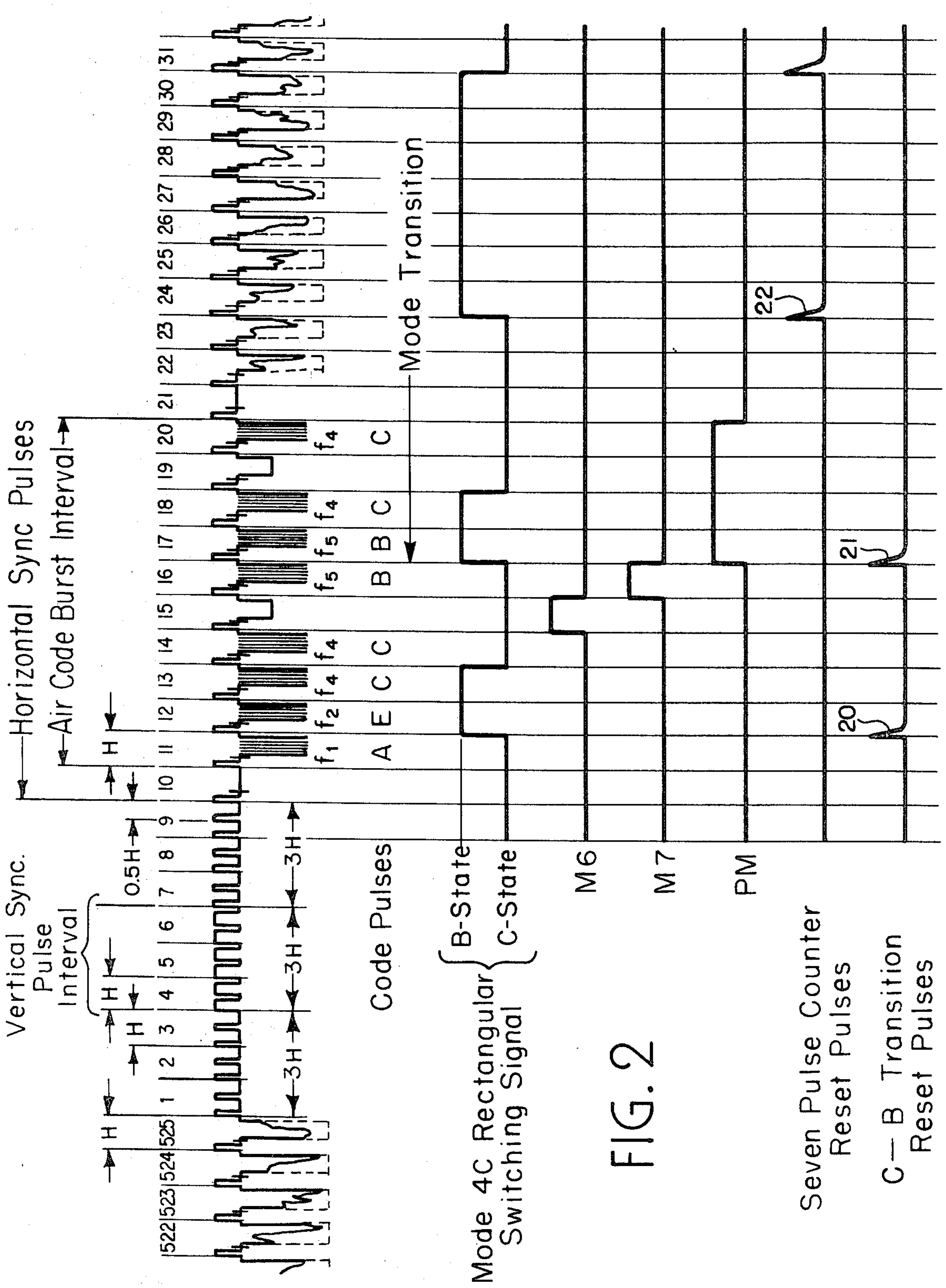
FIG. 2 is a graphical representation of signal waveforms useful in understanding the operation of the encoder of FIG. 1.

The final phase of the rectangular switching signal depends only on the final C to B transition, or phase transition point, since it is only that transition which resets the seven pulse counter to establish a new free-running phase. This can better be seen in FIG. 2, which is a timing chart of various encoder signals during the phase change portion of a vertical retrace interval. The vertical interval is seen to comprise 24 timing slots, each one a single horizontal line in duration and consecutively numbered 1 through 14. The air code burst interval occupies slots 11 through 20 inclusive, and it is during these 10 slots that the phase-determining pulses are generated. For purposes of explanation we will assume that generator 16 produced the illustrated series of pulses during this interval; namely AECCOBBCOC, with O indicating the absence of a pulse.

The phase of the rectangular switching signal has come to be designated as a mode identified with a single numeral and a single letter; the numeral specifying the number of time slots the phase (or mode) transition point (or last reset of the seven pulse counter) precedes the end of the air code burst interval, and the letter indicating the instantaneous state (B or C) of the rectangular switching signal at the end of the air code burst interval. Since seven pulse counter 15 toggles multivibrator 14 every seven lines, the rectangular switching signal has a period of 14 lines or time slots, and hence 14 possible modes; 1B–7B and 1C–7C. Reference is now made to the mode 4C waveform of FIG. 2, which was generated by the aforementioned series of pulses in a manner now to be described. The A pulse generated by generator 16 in time slot 11 toggled multivibrator 14, forcing the rectangular switching signal to transition from its C to B state between slots 11 and 12 producing a reset pulse 20 for seven pulse counter 15. The correlation E pulse in slot 12 caused no change, and the C pulse in slot 13 forced a B to C transition between slots 13 and 14. The C pulse in slot 14 caused no change, since the rectangular switching signal was already in the C state. There was no pulse in slot 15, and hence no change. The B pulse in slot 16 forced a C to B transition between slots 16 and 17, the mode transition point for mode 4C operation, producing a reset pulse 21 which again reset seven pulse counter 15. The B pulse in slot 17 produced no change, and the C pulse in slot 18 forced a B to C transition. The absence of a pulse in slot 19 and the C pulse in slot 20 produced no change, leaving the rectangular switching signal in a C state at the end of the air code burst interval and seven pulse counter 15 with a 4 count as required by mode 4C The switching signal remained in a C state until three time slots later, when seven pulse counter 15 reached a seven count and produced an output pulse 22 which toggled multivibrator 14 to its B mode. For the balance of the vertical scanning cycle counter 15 periodically toggled multivibrator 14 every seven horizontal lines, thus maintaining the rectangular switching signal in the 4C mode during the successive field and at least until the next vertical retrace interval.

In order for the decoder to decode the encoded signal at the subscriber's receiver it is necessary that the decoder locally reconstruct the rectangular switching signal at the same frequency and phase that it was generated at by multivibrator 14. To this end the output terminals 1–6 of random pulse generator 16 are connected to the like-designated input terminals of a novel air code burst generator 23. This stage, which will presently be covered in detail, generates one of six discrete-frequency burst signals upon receipt of a code pulse on a respective one of the six input terminals. Each of the input terminals has associated with it a storage element in the form of a clocked J-K flip-flop, the clock control terminals of which are coupled to a source of horizontal retrace pulses. Thus connected, the input flip-flops perform in a manner similar to multivibrator 14, recognizing only the final output state of generator 16 as it exists upon the occurrence of the horizontal retrace interval following a horizontal scanning interval time slot.

Since it is possible for one and only one output pulse to be generated at one time by generator 16, it is possible for only one of the six input flip-flops to assume a transfer state during a particular retrace interval. Furthermore, once an input flip-flop has assumed its transfer state, it will remain in that state until the next horizontal retrace interval clock pulse, at which time it will return to its quiescent state if generator 16 has assumed a different output state.

While the input flip-flop is in its transfer state, gated oscillator circuitry produces a discrete-frequency burst signal in the range of 500–1,000 kHz. This burst, necessarily of at least one time slot in duration, is combined with the composite video signal in combiner network 12 prior to transmission to the decoders. Thus, for each code pulse generated by generator 16, a burst signal is transmitted in the following time slot at a discrete frequency indicative of the particular generator output terminal the pulse appeared on. In all, 10 such bursts may be transmitted for each air code burst interval, one in each of the 10 reserved time slots. Only when generator 16 generates a O or no output control effect will no burst be produced. In the decoder frequency selective detectors convert the burst back into code pulses on six respective terminals from which the rectangular switching signal is reconstructed in a manner complementary to the generation process just described. It is to the maximization of the efficiency and dependability of this decoding operation that one of the objects of the invention is directed.

In practice, it is not desirable to leave the rectangular switching signal mode selection purely to the haphazard appearance of ten pulses, since that would involve the likelihood of a mode change with every field. Instead, the encoder includes circuitry which inhibits the operation of the random pulse generator to the extent necessary to force a particular switching signal mode. For instance, assuming that it is desired to continue to operate with a rectangular switching signal of the 4C mode as in FIG. 2, it is necessary to reset the seven pulse counter at the mode transition point between time slots 16 and 17. In order for this to occur, the rectangular switching signal must transition from a C state in time slot 16 to a B state in time slot 17 to obtain a C to B transition. Since the pulse generator is normally completely random, the only way to insure this transition is to inhibit the generator from producing certain output pulses which would not force the required transition. Specifically, during time slot 15, A and B pulses are inhibited since these would prevent the necessary C state in time slot 16. In time slot 16 the rectangular switching signal must transition to the B state, so C, D, E and O pulses are inhibitd. Once the transition has taken place it is necessary to insure that a C state will exist in time slot 20, so A and B are inhibited, the only two outputs which would if generated change the already existing C state to a B state.

It must be understood that in inhibiting a particular output pulse from random pulse generator 16, the inhibited output state is actually removed from the random selection and the chances for one of the other states being selected are improved. This makes it possible to force a particular output pulse by inhibiting all other states from consideration.

While the mode of the rectangular switching signal could be set manually by means of a pair of switches designating the numeric portion 1–7 and the terminal state B/C of the mode, it is preferable for security reasons to randomly select a new mode at random intervals during normal operation of the system. To this end the encoder includes a mode change control circuit 24 which produces a control signal at random intervals for initiating a change in the rectangular switching signal mode. The control signal is applied to one input of an AND gate and serves as an enabling signal for that device. When and only when control circuit 24 calls for a mode change, a random selection of a new mode is accomplished by feeding random noise pulses from a noise generator 25 through an AND gate 26 and into a seven-position mode select counter 27 and a two-position B/C mode select counter 28 for a predetermined period of time. When the counting period has ended, the seven-position counter will unpredictably occupy one of its seven states, thus randomly designating the numeric portion of the new operating mode. Similarly, the two stage counter will occupy one of its two states, thus randomly designating whether the new mode will be a B mode or a C mode.

The 1–7 numeric selection of the counter appears as a single enabling signal at a respective one of seven output terminals. These terminals are in turn connected to respective ones of seven NAND gates 29–35, the other inputs of the gates being connected to sources of timing pulses occurring three time slots prior to the particular time slot in which the mode associated with the particular seven position counter output calls for a mode change. For example, should the counters call for a mode 4C rectangular switching signal, the 4 output terminal only of counter 27 would be high, enabling only NAND gate 32. The other input of gate 32 is connected to a source of timing pulses coinciding with time slot 14, henceforth designating TP14. The outputs of gates 29–35 are connected together to form a common output consisting of a single pulse MN three time slots prior to the mode change point. The MN pulse, in this case TP14, is applied to an inhibit logic control circuit 36, which responds to the MN pulse by generating an M6 control pulse three time slots prior to the mode change, an M7 control pulse two time slots prior to the mode change, and a post-mode or PM control pulse between one time slot prior to the mode change and the end of the air code burst interval. These assignments take into account the one-line delays introduced by multivibrator 14 and air code burst generator 23. In our example M6 would coincide with slot 14, M7 slot 15, and MN with slots 16–20, inclusive. These three control pulses, together with the output of the B/C counter, are applied to inhibit logic circuits 18 and utilized therein to set up the necessary function inhibit signals preceding and following the mode change.

In determining which functions are to be inhibited, logic circuits 18 take into account the desired mode via the M6, M7, PM and B/C counter output signals, the present state of the rectangular switching signal via the B and C outputs of multivibrator 14, and the prior occurrence of D and E pulses to determine whether a correlation or end of program pulse can or should be transmitted during a particular air code burst interval. The output of logic circuits 18 is in the form of inhibit pulses for the various functions, namely $\overline{A}$, $\overline{B}$, $\overline{C}$, $\overline{D}$, $\overline{E}$ and $\overline{O}$. With the exception of the $\overline{O}$ signal, which is coupled directly, these function inhibit signals become inhibit signals for the six possible output states 1–6 of random pulse generator 16 by means of a second program transposition matrix 37, which couples the function inhibit signals to appropriate inhibit inputs $\overline{1}$–$\overline{6}$ of generator 16 with the same permutations provided by matrix 17. Thus, when inhibit logic circuit 18 calls for no B to be transmitted during a particular one of the 10 air code burst interval time slots, it outputs a $\overline{B}$ signal which becomes a $\overline{5}$ signal and prevents random pulse generator 16 from generating a 5 pulse during that time slot.

Figure 3:
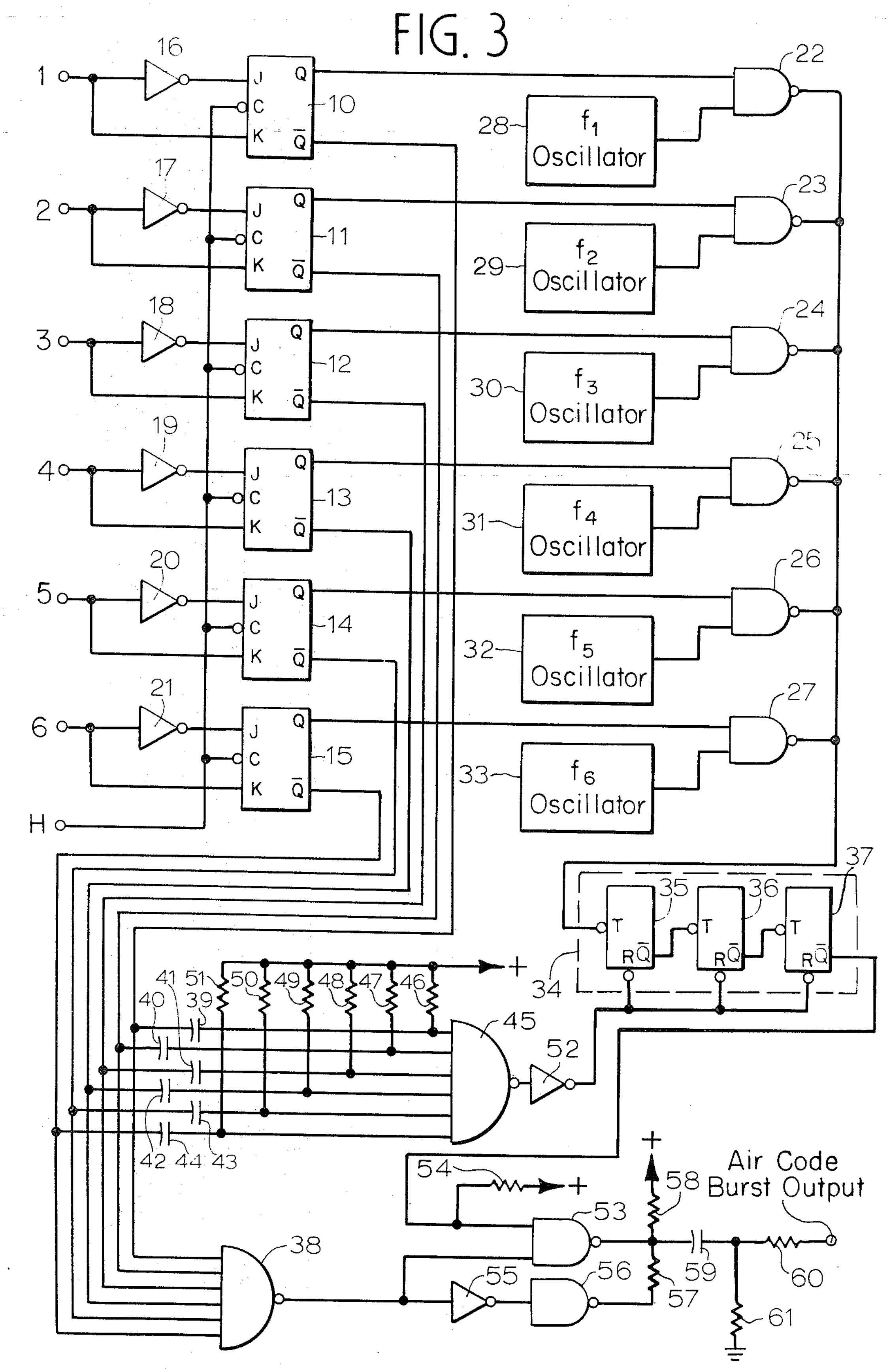
FIG. 3 is a schematic diagram, partially in block diagram form, of an air code burst generator constructed in accordance with the invention.

Having considered the operation of the encoder as a system, we are now in a position to consider in detail the novel circuitry of the air code burst generator 23, which is shown in detail in FIG. 3 and to which the present invention is directed. Referring to FIG. 3, the six code pulses from generator 16 are applied to respective ones of six like-designated input terminals 1–6. Each of these input terminals has associated with it a bistable memory element or buffer stage in the form of a respective one of six J-K flip-flops 10–15, and is coupled to the K input terminal of its associated flip-flop by direct connection, and to the J input terminal by respective ones of inverters 16–21. Thus, upon application of a negative code pulse from generator 16 to one of the input terminals, the flip-flop associated with that terminal receives a positive input or "logic 1" on its J input terminal, and a negative input or "logic 0" on its K input terminal.

Each of the J-K flip-flops, as is well known to the art, has first and second stable operating states. These states are generally defined in terms of high and low voltage conditions on the output terminals of the flip-flops, a high voltage condition being approximately the reference or supply voltage, generally in the order of 5.0 volts for the most common logic elements, and a low voltage condition being some value less than reference, generally near or equal to 0 volts or ground potential. In the discussion to follow we will define the first or so-called high state of the J-K flip-flops as that where their $\overline{Q}$ output terminal is high and their Q output terminal is low, and the second or so-called low state as that where Q is low and $\overline{Q}$ high. It should also be noted that when referring to the polarity of a pulse, reference is being made to the direction the pulse extends, and not necessarily to the actual direct current polarity of the circuit carrying the pulse.

As is also well known to the art, the application of input signals to a clocked J-K flip-flop has no effect on the output state of the flip-flop until the occurrence of a clock pulse, at which time the output state of the flip-flop assumes the state of the input. This feature is used to good advantage in generator 23 to insure that the generator will not respond to the random selection process of inhibitable random pulse generator 16, but only to the final selection of that stage as it exists at the end of each time slot during the air code burst interval. This is accomplished by simultaneously applying horizontal retrace pulses to the clock inputs of the six flip-flops, so that only upon occurrence of retrace pulses, which always occur well after generator 16 has made its selection, will the outputs of the flip-flops be made to agree with the input state. Once the flip-flop has been switched, it remains in its new state for the duration of the succeeding time slot; introducing in effect a one time slot delay between determination of the code pulse and transmission of the corresponding code burst. This delay is compatible with the delay introduced by multivibrator 14 in generating the rectangular switching signal.

The Q output terminal of each of the flip-flops is coupled to one input terminal of a respective one of six two-input logical NAND gates 22–27. As is well known to the art, these gates are open or enabled only when their input terminals are high, a condition possible only when the Q terminal of their associated J-K flip-flop is high. Since Q is high on a particular flip-flop only if a negative pulse has been previously applied to the code pulse input terminal associated with that flip-flop, and a clock pulse has subsequently been applied to the flip-flop, gates 22–27 will be open for the time slot following the application of a code pulse to their associated input terminal.

The six NAND gates comprise switching means for controlling the translation of RF signals from respective ones of six continuous-wave signal sources in the form of discrete-frequency crystal-controlled RF oscillators 28–33. The output frequencies of these oscillators are selected to be harmonically related to the desired air code burst frequencies, which were selected for minimum interference with the various components of the composite signal. In practice, the burst frequencies approximate 535 kHz, 598 kHz, 676 kHz, 787 kHz, 865 kHz and 960 kHz, and in accordance with the above criteria, the output frequencies for oscillators 28–33 approximate 4.3 MHz, 4.8 MHz, 5.4 MHz, 6.3 MHz, 6.9 MHz and 7.7 MHz, respectively.

The output of each oscillator is applied directly to the remaining input terminal of its associated NAND gate, so that only when the gate is open will the RF signal be translated through the gate. The outputs of gates 22–27 are connected to the input of frequency-dividing means in the form of a divide-by-eight counter 34. This counter comprises three bistable counting elements, flip-flops 35, 36 and 37. The $\overline{Q}$ output terminals of flip-flops 35 and 36 are connected to the toggle inputs of flip-flops 36 and 37, respectively, to establish the desired counting cycle. There are eight counting states in all, an initial state, six intermediate states, and a final state. In the illustrated embodiment the continuous-wave RF signal from the combined outputs of gates 22–27 is applied to the toggle input of flip-flop 35 and the $\overline{Q}$ output of flip-flop 37 serves as the divided-by-eight output of the counter.

The $\overline{Q}$ outputs of the J-K buffer flip-flops 10–15 are connected to respective ones of the inputs of a six input logical NAND gate 38, and to respective ones of six capacitors 39–44. The opposite terminal of each of these capacitors is connected to a respective one of the inputs of a six input logical NAND gate 45, and through respective ones of resistors 46–51 to a source of unidirectional current. Capacitors 39–44, in conjunction with their associated resistors 46–51, respectively form individual R-C differentiating networks for the $\overline{Q}$ output signals from flip-flops 10–15, respectively. The output of NAND gate 45 is applied to an inverter 52, wherein it is inverted prior to application to the reset terminals of flip-flops 35, 36 and 37. Thus, the transition of any one of flip-flops 10–15 to its high state, i.e., $\overline{Q}$ low state, is differentiated to produce an output pulse at the output of NAND gate 45, which after inversion is applied to counter 34 to establish the counting elements of that device in their initial (all reset) counting state.

The output of counter 34, derived at the $\overline{Q}$ terminal of flip-flop 37, is connected to one input of a two-input logical NAND gate 53, and to a source of unidirectional current by a resistor 54. The other input terminal of gate 53 is connected to the output of NAND gate 38, which is also connected to an inverter 55 and thence to the single input of another NAND gate 56. The output of gate 53 is coupled to a resistor 57 to the output of gate 56, and by a resistor 58 to a source of unidirectional current. The output of NAND gate 53 is also connected by the series combination of a coupling capacitor 59 and resistor 60 to the air code burst output terminal of the generator. A resistor 61 is connected from the juncture of capacitor 59 and resistor 60 to ground to complete the load matching network.

The operation of the generator may best be explained by assuming a 1 code pulse to have been generated during a particular time slot by random pulse generator 16. This negative pulse is applied directly to the K input terminal of flip-flop 10, and with inverted polarity to the J input terminal through inverter 16. These inputs have no effect on the output of flip-flop 10 until the occurrence of a horizontal retrace pulse, the leading edge of which constitutes a clock pulse for forcing the output state of the flip-flop to agree with the then present input state. In the present example this would result in a transition to Q high and $\overline{Q}$ low.

With Q high, gate 22 is enabled, allowing the 4.3 MHz continuous-wave signal from oscillator 28 to be applied to counter 34. Since it is possible for only one code pulse to be generated by inhibitable random pulse generator 16 at one time, only one of gates 22–27 can be enabled at a time, and thus, the output of only one of oscillators 28–33 can be applied to counter 34 at a time. Counter 34 divides the applied frequency bursts by a factor of eight, each successive cycle stepping the counter through its eight counting states until it finally reaches an eight count, at which time it starts its counting cycle anew.

Once flip-flop 10 has been forced into a high state by application of a 1 code pulse to its associated pulse input terminal and receipt of a clock pulse, it remains in that state at least until the occurrence of the next clock pulse. Should the next code pulse appear on another input terminal, the absence of a pulse on the 1 terminal transitions the flip-flop back to a low state, i.e., Q low, $\overline{Q}$ high.

For maximum efficiency in demodulating the air code bursts, it is imperative that the bursts as finally applied to the composite video signal occur in a predetermined predictable phase relationship. That is, it is desirable that an integral number of cycles occur within one time slot, and that the burst start the time slot with a minima and end with a maxima. This provides a maximum output from the resonant circuits utilized in the decoders for detecting the presence and identity of the bursts, thereby obviating the need for additional stages of amplification. To achieve this phase predictability, counter 34 is, in accordance with one aspect of the invention, reset to its initial counting state upon transition of any one of flip-flops 10–15 to a high state to insure that it will in all cases start its counting cycle from the same initial counting state. Means for accomplishing this reset comprise the six different RC differentiating networks, the six-input NAND gate 45, and inverter 52. Returning to our example and FIG. 3, capacitor 39 and resistor 46 comprise a differentiating network coupled to the $\overline{Q}$ output of flip-flop 10. Upon transition of the $\overline{Q}$ terminal from its normally high state to a low state, this network produces a narrow negative polarity pulse. This pulse is applied to one input of NAND gate 45, and acts in that device to produce a positive output pulse. This pulse is inverted by inverter 52 and applied to the reset terminals of flip-flops 35, 36 and 37, re-establishing counter 34 in its reset or initial counting state.

The output of counter 34, as derived at the $\overline{Q}$ output terminal of flip-flop 37, is applied to NAND gate 53, which in accordance with another aspect of the invention, serves as part of a novel output circuit for establishing a uniform output level in the absence of an air code burst. This is desirable, since it greatly simplifies combining the train of air code burst signals produced during an air code burst interval with the composite video signal. Specifically, the previously outlined connections between the $\overline{Q}$ output terminals of counters 10–15 and NAND gate 38 serve to establish the output of that logic element low in the absence of a code pulse, i.e., when flip-flops 10–15 are all low. This output condition inhibits gate 53, and enables gate 56 by virtue of inversion in inverter 55. As a result, the output of counter 34 is blocked and the previously floating end of the voltage divider formed by resistors 57 and 58 is grounded. This in turn establishes the juncture of the resistors, and hence the output terminal of gate 53, at a predetermined voltage level dependent on the relative resistances of the two resistors. In practice, this voltage is chosen to be approximately 2.5 volts, or one-half the unidirectional supply voltage of 5.0 volts. Capacitor 59 is a conventional coupling capacitor, and resistors 60 and 61 serve as a conventional impedance matching network, together forming translating means for matching the output impedance of the encoder to subsequent processing equipment in the studio.

Thus, a generator circuit has been shown for producing a train of discrete-frequency air code bursts in response to receipt of a train of code pulses. The generator offers improved phase and frequency stability, with maximum utilization of compact logic circuitry and improved performance over prior-art designs. The generator includes a novel frequency-dividing counter circuit for establishing phase-compatible transitions between adjacent air code bursts, and provides for the establishment of a no-pulse DC output level to simplify the combination of the air code burst signal with the composite video signal.

While a particular embodiment of the invention has been shown and described, it will be obvious to those skilled in the art that changes and modifications may be made without departing from the invention in its broader aspects, and, therefore, the aim of the appended claims is to cover all such changes and modifications.

I claim:

1. In a subscription television system or the like, an air code burst generator for producing a discrete-frequency burst output signal in response to an applied code pulse, comprising:

a continuous-wave signal source having an output frequency harmonically related to said discrete burst frequency;

frequency dividing means comprising a counter stepped by an applied signal from an initial state through a predetermined number of intermediate states to a final state for dividing the frequency of said harmonically related signal down to the frequency of said discrete burst;

means for resetting said counter to said initial state upon receipt of said code pulse; and switching means for applying the continuous-wave signal from said source to said counter to generate with phase predictability said burst output signal.

2. An air code burst generator as described in claim 1 wherein said continuous wave signal is harmonically related to said discrete-frequency burst signal by a factor equal to the division factor of said frequency-dividing means.

3. An air code burst generator as described in claim 2 wherein said frequency-dividing means divide the frequency of an applied signal by a factor equal to the number of counting states said counter occupies in stepping from said initial state to said final state.

4. An air code burst generator as described in claim 1 wherein said counter comprises at least one counting element and wherein said means for resetting said counter comprise a differentiating network for converting said code pulse to a momentary reset pulse for application to said counting elements.

5. An air code burst generator as described in claim 1 further including a bistable memory element responsive to said applied pulses by switching from a first state to a second state, and wherein said switching means comprise a logic state coupled between said source and said counter, said gate being opened only when said memory element is in said second state.

6. In a subscription television system or the like, an air code burst generator for producing different discrete-frequency burst output signals in response to receipt of respective ones of a plurality of different applied code pulses, comprising:

a plurality of continuous-wave signal sources each corresponding to a respective one of said pulses and each having an output frequency harmonically related to the discrete burst frequency associated therewith;

frequency dividing means comprising a counter stepped by an applied signal from an initial state through a predetermined number of intermediate states to a final state for dividing the frequency of an applied one of said harmonically related signals down to the frequency of its associated discrete burst signal;

means for resetting said counter to said initial state upon receipt of one of said plurality of possible code pulses; and means for applying the continuous-wave signal from the source corresponding to a received code pulse to said counter to generate with phase predictability the burst signal corresponding to that pulse.

7. An air code burst generator as described in claim 6 wherein said continuous-wave signals are harmonically related to said discrete-frequency burst signals by a factor equal to the division factor of said frequency-dividing means.

8. An air code burst generator as described in claim 7 wherein said frequency-dividing means divide the frequency of an applied signal by a factor equal to the number of counting states said counter occupies in stepping from said initial state to said final state.

9. An air code burst generator as described in claim 6 wherein said counter comprises at least one counting element and wherein said means for resetting said counter comprise a differentiating network for converting said code pulses to a momentary reset pulse for application to said counting element.

10. An air code burst generator as described in claim 6 further including a bistable memory element responsive to said applied pulses by switching from a first state to a second state, and wherein said switching means comprise a logic gate coupled between said source and said counter, said gate being opened only when said memory element is in said second state.

11. In an air code burst generator for a subscription television system or the like, a level-equalizing output circuit comprising:

a DC voltage source;

a voltage divider comprising serially-connected impedances, one end terminal of said divider being connected to said voltage source;

means for impressing the burst output signals generated by said generator at the juncture of said impedances;

means for grounding the remaining terminal of said voltage divider only in the absence of a burst signal to establish a predetermined voltage level at said juncture; and translating means for deriving the level-equalized burst signal from said juncture for subsequent utilization.

12. A level-equalizing output circuit as described in claim 11 wherein said means for grounding the remaining terminal of said voltage divider comprises a logic gate, said gate being enabled only in the absence of a burst signal.

* * * * *